US00RE47933E

(19) United States
(12) Reissued Patent
Allen

(10) Patent Number: US RE47,933 E
(45) Date of Reissued Patent: Apr. 7, 2020

(54) RELIABILITY ESTIMATOR FOR AD HOC APPLICATIONS

(71) Applicant: Amazon Technologies, Inc., Seattle, WA (US)

(72) Inventor: Nicholas Alexander Allen, Kirkland, WA (US)

(73) Assignee: Amazon Technologies, Inc., Seattle, WA (US)

(21) Appl. No.: 15/466,626

(22) Filed: Mar. 22, 2017

Related U.S. Patent Documents

Reissue of:
(64) Patent No.: 8,972,564
Issued: Mar. 3, 2015
Appl. No.: 13/223,972
Filed: Sep. 1, 2011

U.S. Applications:
(63) Continuation of application No. 15/449,814, filed on Mar. 3, 2017, now Pat. No. Re. 47,593, which is an application for the reissue of Pat. No. 8,972,564.

(51) Int. Cl.

| | |
|---|---|
| ***G06F 11/00*** | (2006.01) |
| ***G06F 9/44*** | (2018.01) |
| ***G06F 11/36*** | (2006.01) |
| ***G06F 15/16*** | (2006.01) |

(52) U.S. Cl.
CPC ..... *G06F 11/008* (2013.01); *G06F 9/44* (2013.01); *G06F 11/00* (2013.01); *G06F 11/3604* (2013.01); *G06F 15/16* (2013.01)

(58) Field of Classification Search
CPC ..... G06F 11/00; G06F 11/08; G06F 15/16; G06F 11/3604; G06F 9/44
See application file for complete search history.

(56) References Cited

U.S. PATENT DOCUMENTS

| | | | | |
|---|---|---|---|---|
| 6,606,658 | B1 | 8/2003 | Uematsu | |
| 7,703,072 | B2 * | 4/2010 | Nakamura et al. | 717/107 |
| 7,823,009 | B1 | 10/2010 | Tormasov et al. | 714/6 |
| 2002/0138353 | A1 * | 9/2002 | Schreiber et al. | 705/26 |
| 2007/0294290 | A1 * | 12/2007 | Hansen et al. | 707/103 R |
| 2010/0042720 | A1 | 2/2010 | Stienhans et al. | 709/226 |

(Continued)

OTHER PUBLICATIONS

Boudali et al., "A discrete-time Bayesian network reliability modeling and analysis framework," Reliability Engineering and System Safety 87(3):337-349, available online Aug. 12, 2004, print publication Mar. 2005.

(Continued)

*Primary Examiner* — Robert L Nasser
(74) *Attorney, Agent, or Firm* — Davis Wright Tremaine LLP

(57) ABSTRACT

In certain embodiments, a computer-implemented method includes receiving a request for a reliability estimate associated with an ad hoc application. In response to the request, one or more components associated with the ad hoc application and upon which the ad hoc application relies are identified. The method also includes generating a directed graph. The directed graph identifies one or more dependency relationships among the identified components. The method also includes calculating, based at least in part on the directed graph, a reliability estimate for the ad hoc application.

33 Claims, 5 Drawing Sheets

(56) References Cited

U.S. PATENT DOCUMENTS

| | | | | |
|---|---|---|---|---|
| 2010/0076856 | A1 | 3/2010 | Mullins | 705/26 |
| 2010/0299366 | A1 | 11/2010 | Stienhans et al. | 707/803 |
| 2010/0332262 | A1 | 12/2010 | Horvitz et al. | 705/4 |
| 2010/0332629 | A1 | 12/2010 | Cotugno et al. | 709/221 |
| 2011/0030065 | A1* | 2/2011 | Kulakowski | 726/26 |
| 2011/0061041 | A1* | 3/2011 | Hellebro et al. | 717/120 |
| 2011/0239039 | A1 | 9/2011 | Dieffenbach et al. | 714/4.1 |
| 2011/0271270 | A1 | 11/2011 | Bowen | 717/171 |

OTHER PUBLICATIONS

Jalote et al., "Measuring Reliability of Software Products," International Symposium on Software Reliability (ISSRE-2004), Nov. 2004, 14 pages.

Kan, "Metrics and Models in Software Quality Engineering, Second Edition," Addison-Wesley Professional, Sep. 16, 2002, 7 pages.

Olsson et al., "On Latin hybercube sampling for structural reliability analysis," Structural Safety 25(1):47-68, available online Apr. 29, 2002, print publication Jan. 2003.

A Olsson et al., "On Latin Hypercube sampling for structural reliability analysis" Oct. 2001, p. 1-22.*

Metrics and Models in Software Quality Engineering, Second Edition by: Stephen H. Kan Pub. Date: Sep. 16, 2002.*

A discrete Time Bayesian network reliability modeling and analysis framework H. Boudali. J. B. Dugan University of Virginia, accepted Jun. 8, 2004 Available online Aug. 12, 2004.*

H. Boudali "A discrete-time Bayesian network reliability modeling and analysis framework" University of Virginia, School of Engineering and Applied Science, ECE Department, Available online Aug. 12, 2004 Abstract.*

A. Olsson* , G. Sandberg, O. Dahlblom "On Latin hypercube sampling for structural reliability analysis" Division of Structural Mechanics, Lund University, PO Box 118, SE-221 00 Lund, Sweden accepted Feb. 27, 2002.*

Bankaj et al . "Measuring Reliability of Software Products" Microsoft corporation. Date of Conference 2004.*

* cited by examiner

600a

| VOLUME 1 | SWITCH | SERVER 1 |
|---|---|---|
| 0 | 0 | 0% |
| 1 | 0 | 0% |
| 0 | 1 | 0% |
| 1 | 1 | 99.6 % |

600b

| SWITCH | DATABASE |
|---|---|
| 0 | 0% |
| 1 | 99.76 % |

600c

| POWER 1 | POWER 2 | SWITCH |
|---|---|---|
| 0 | 0 | 0% |
| 0 | 1 | 99.99 % |
| 1 | 0 | 99.99 % |
| 1 | 1 | 99.99 % |

*FIG. 6*

700

| | ROOM | POWER 1 | POWER 2 | SWITCH | VOLUME 1 | ... | APPLICATION |
|---|---|---|---|---|---|---|---|
| TRIAL 1 | 1 | 1 | 1 | 1 | 1 | ... | 1 |
| TRIAL 2 | 1 | 1 | 0 | 1 | 1 | ... | 1 |
| TRIAL 3 | 1 | 0 | 0 | 0 | 0 | ... | 0 |
| ⋮ | ⋮ | ⋮ | ⋮ | ⋮ | ⋮ | ... | ⋮ |
| TRIAL 1,000,000 | 1 | 1 | 0 | 1 | 0 | ... | 0 |

*FIG. 7*

RELIABILITY ESTIMATOR FOR AD HOC APPLICATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATION*

*This application, U.S. patent application Ser. No. 15/466,626, along with U.S. patent application Ser. No. 15/449,814 filed on Mar. 3, 2017, now U.S. Pat. No. RE47,593, are both reissue applications of U.S. patent application Ser. No. 13/223,972, filed Sep. 1, 2011, now U.S. Pat. No. 8,972,564, entitled "RELIABILITY ESTIMATOR FOR AD HOC APPLICATIONS."*

BACKGROUND

Reliability is an important business property. Reliability, however, can be difficult to measure in a distributed system comprising many disparate components with differing levels of availability and redundancy. This is particularly true when portions of the service infrastructure are purchased from another company, which may not reveal details of its internal infrastructure. Formal models, end-to-end system descriptions, and simple, uncorrelated modes of failure may be inadequate in more complicated systems in which internal components are obscured from a user.

BRIEF DESCRIPTION OF THE DRAWINGS

For a more complete understanding of the present disclosure and its advantages, reference is made to the following descriptions, taken in conjunction with the accompanying drawings, in which:

FIG. 6 illustrates conditional probability tables 600a-c for application and infrastructure components included in the example directed graph illustrated in FIG. 5, according to certain embodiments of the present disclosure;

FIG. 7 illustrates an example table that includes the results of an example series of trials performed by the example system of FIG. 1 to calculate a reliability estimate, in accordance with particular embodiments of the present disclosure.

DETAILED DESCRIPTION OF EXAMPLE EMBODIMENTS

Cloud providers deliver a set of services that can be used to construct applications in a reliable, scalable, and inexpensive manner. These benefits, however, should be obtained by using the services in a careful manner. While some properties such as cost are relatively easy to measure, other properties such as reliability are not. Past solutions to measure reliability of interconnected components, systems, and/or applications have included manual efforts to calculate application reliability from fault trees, reliability block diagrams, and other modeling approaches. These calculations often require access to exact network schematics and aggregate reliability data, which may be highly confidential and proprietary business information. Alternatively, efforts to calculate application reliability have treated these factors as black boxes, which limits the estimation of reliability to coarse-grain measures. These methods often incorrectly assume that all failures are independent and that the rate at which failures occurs is constant.

Particular embodiments of the present disclosure address these and other limitations of previous systems by incorporating user input of an application definition and relationships between computing resources to determine an infrastructure and application configuration. Based on historical availability of the infrastructure and application resources, conditional probability tables are generated that indicate the availability of infrastructure and application components under various circumstances (such, as, e.g., whether directly relied upon components are available or not available). A reliability estimate is generated by running a large number of successive trials in which the availability or non availability of an infrastructure or application component is determined in accordance with the statistical probabilities indicated in the generated conditional probability tables. Thus, the reliability estimate may then be estimated based on the aggregate number of times an ad hoc application is determined to be available or not available in the total number of trials. The reliability estimate may be transmitted to a user of an ad hoc application.

Figure 1:
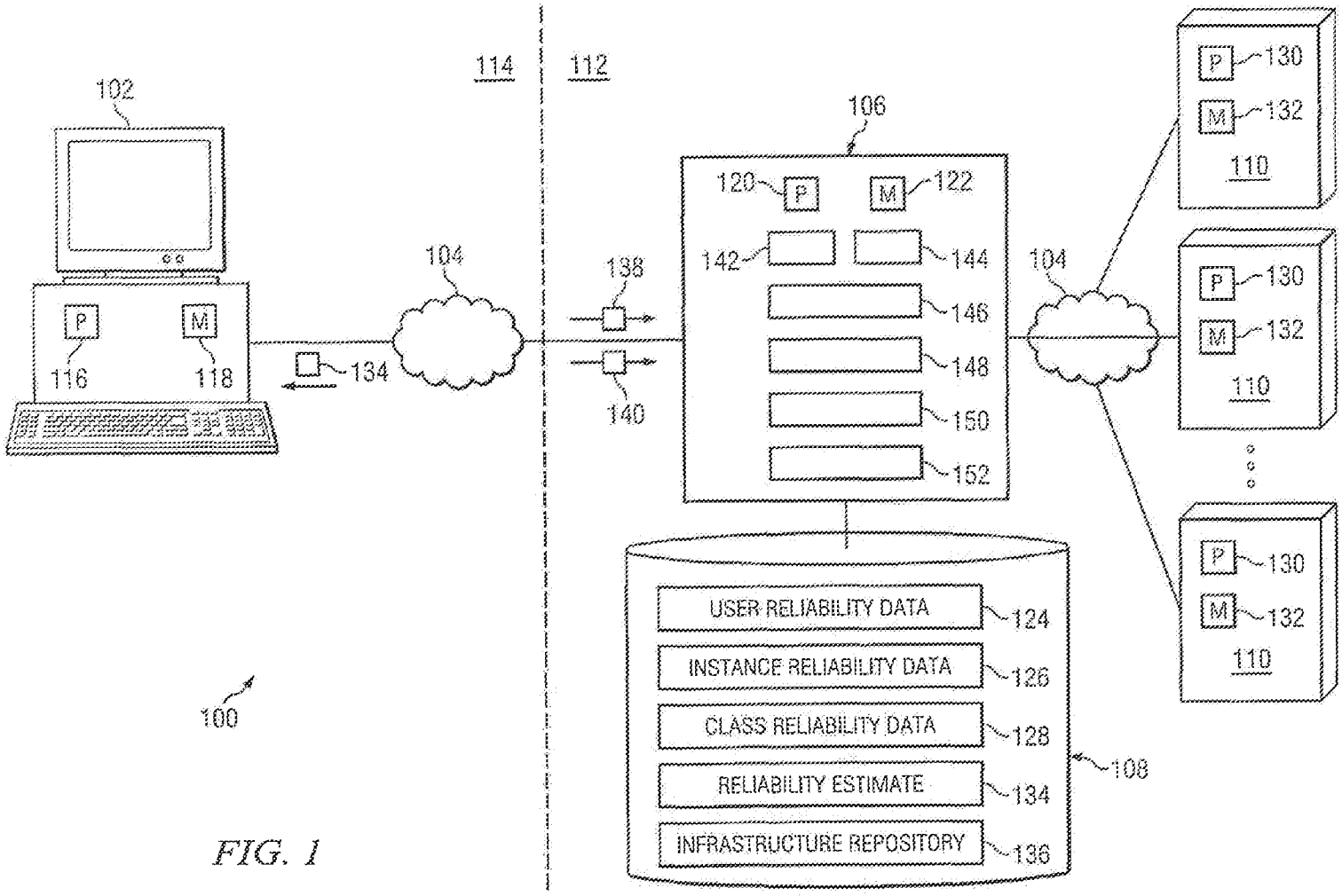
FIG. 1 illustrates an example system for estimating reliability of an ad hoc application, according to certain embodiments of the present disclosure.

FIG. 1 illustrates an example system 100 for a reliability estimator for ad hoc applications, according to certain embodiments of the present disclosure. In the illustrated example, system 100 includes a user system 102, a network 104, a server system 106, a storage module 108, and one or more computing resources 110. Although system 100 is illustrated and primarily described as including particular components, the present disclosure contemplates system 100 including any suitable components, according to particular needs.

In general, portions of system 100 provide an environment in which one or more computing resources (e.g., computing resources 110) is made available over a communication network (e.g., network 104) to one or more remote computer systems, such as user system 102. In certain embodiments, server system 106, storage module 108, and computing resources 110 may be communicatively coupled together over a high speed communication network and collectively may comprise a computing infrastructure, which may be referred to as a provisioned computing resources environment 112. User system 102 and/or network 104 may be external to provisioned computing resources environment 112 and may be referred to as an external computing environment 114.

In certain embodiments, provisioned computing resources environment 112 (including, for example, one or more of server system 106, storage module 108, and computing resources 110) may provide a collection of remote computing services offered over a network (which may or may not be network 104). Those computing services may include, for example, storage, computer processing, networking, applications, or any other suitable computing resources that may be made available over a network. In some embodiments, computing resources may be referred to as ad hoc applications, which may be provisioned or de-provisioned according to the requirements and/or configuration of external computing environment 114. In certain embodiments, entities accessing those computing services may gain access to a suite of elastic information technology (IT) infrastructure services (e.g., computing resources 110) as the entity requests those services. Provisioned computing resources environment 112 may provide a scalable, reliable, and secure distributed computing infrastructure.

In association with making those computing resources 110 available over the network (e.g., provisioning the computing resources 110), a variety of reliability parameters may be generated. These reliability parameters may indicate or represent the availability or non-availability of a particular provisioned ad hoc application (or its underlying infrastructure or application components) to user system 102 or external computing environment 114. Reliability parameters may be referred to as reliability metrics data. Server 106 uses reliability metrics data to determine a reliability estimate for one or more ad hoc applications. Reliability metrics data may be associated with a particular component, system, software, application, interface, and/or network included in provisioned computing resources environment 112. Particular examples of reliability metrics data may include user reliability data 124, instance reliability data 126, and class reliability data 128, discussed further below.

Portions of system 100 may determine reliability metrics data associated with components of system 100 (e.g., computing resources 110). It may be appropriate to communicate a portion or all of this reliability metrics data over a network (e.g., network 104) to a server so that the server (e.g., server system 106) may use the communicated reliability metrics data. For example, reliability metrics data may be communicated over a network (e.g., network 104) to a server (e.g., server system 106), so that server system 106 may calculate reliability estimate 134 for one or more ad hoc applications. A particular reliability estimate 134 may be communicated over network 104 to user system 102 in response to a query for reliability data associated with a particular ad hoc application.

User system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device. User system 102 may be a stand-alone computer or may be a part of a larger network of computers associated with an entity.

User system 102 may include processing unit 116 and memory unit 118. Processing unit 116 may include one or more microprocessors, controllers, or any other suitable computing devices or resources. Processing unit 116 may work, either alone or with other components of system 100, to provide a portion or all of the functionality of system 100 described herein. Memory unit 118 may take the form of volatile or non-volatile memory including, without limitation, magnetic media, optical media, RAM, ROM, removable media, or any other suitable memory component.

In general, user system 102 communicates tag information 138 and application definition 140 to server system 106 to facilitate reliability estimation for an ad hoc application. First, user system 102 may interact with component tagging module 142 to apply one or more metadata tags (e.g., tag information 138) to computing resources 110. A metadata tag may be a short, textual string that describes one or more aspects of the relevant computing resource 110. For example, if user system 102 is provisioned with an ad hoc application (e.g., an accounting software package) that runs on two processing computing resources 110 and one database computing resource 110, the user may tag each of the computing resources 110 with the string 'accounting' to associate the computing resources with the provisioned ad hoc application. Tag information 138 may also describe configuration relations. For example, tag information 138 may link resources with resource addresses, access control policies, firewall rules, or connection strings. In general, tag information 138 includes metadata information that associates a particular computing resource 110 with an ad hoc application provided to user system 102.

Second, user system 102 may interact with application definition module 144 to create an application definition (e.g., application definition 140) of a provisioned ad hoc application. Application definition 140 includes at least a primary computing resource 110 for which reliability estimate 134 is to be calculated. Application definition 140 may include one or more secondary computing resources 110 that are supportive of the primary computing resource 110. For example, the primary computing resource 110 may be software service while a secondary computing resource 110 may be a web service accessed by the software service. In some embodiments, application definition 140 may not define all secondary computing resources 110 used by a particular ad hoc application. Graph inference module 146 may expand the user-provided ad hoc application definition 140 into a more comprehensive application definition. In some embodiments, application definition module 144 defines the starting seeds for graph inference module 146. Graph inference module 146 is discussed in greater detail below with respect to FIGS. 2 and 5.

A user of user system 102 may include, for example, a person capable of requesting and receiving a reliability estimate for an ad hoc application. As a more particular example, a user of system 102 may be associated with an entity using the computing resources (e.g., computing resources 110) made available over a network.

Network 104 facilitates wireless or wireline communication. Network 104 may communicate, for example, IP packets, Frame Relay frames, Asynchronous Transfer Mode (ATM) cells, voice, video, data, and other suitable information between network addresses. Network 104 may include one or more local area networks (LANs), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, and/or any other communication system or systems at one or more locations, any of which may be any suitable combination of wireless and wireline.

Server system 106 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, one or more processors within these or other devices, or any other suitable processing device. Server system 106 may be a stand-alone computer or may be a part of a larger network of computers associated with an entity.

Server system 106 may include processing unit 122 and memory unit 124. Processing unit 122 may include one or more microprocessors, controllers, or any other suitable computing devices or resources. Processing unit 122 may work, either alone or with other components of system 100, to provide a portion or all of the functionality of system 100 described herein. Memory unit 124 may take the form of volatile or non-volatile memory including, without limitation, magnetic media, optical media, RAM, ROM, removable media, or any other suitable memory component.

Server system 106 may calculate reliability estimate 134 for one or more ad hoc applications. In particular, server system 106 calculates reliability estimate 134 based on data received from or determined in conjunction with other components of system 100. In particular, server system 106 may calculate reliability estimate 134 based on one or more of reliability data 124, instance reliability data 126, class reliability 128, infrastructure repository 136, user tag information 138, and application definition 140. As described further below, server system 106 may process this received data using one or more of component tagging module 142, application definition module 144, graph inference module 146, reliability estimator module 148, application probability module 150, and infrastructure probability module 152 to calculate reliability estimate 134.

User reliability data 124 represents historical availability or non-availability of a computing resource 110 (e.g., an ad hoc application) as determined by direct observation of user system 102. For example, user system 102 may periodically perform a health check on an ad-hoc application to determine whether the ad hoc application is operational. User system 102 may communicate the results of the health check to server system 106, which may store the results as user reliability data 124.

Instance reliability data 126 represents the historical availability or non-availability of a particular computing resource 110 (e.g., a server, disk drive, network interface, power supply, etc.). For example, one or more components of system 100 (e.g., server system 106) may periodically perform a health check of infrastructure components to determine their respective availability or non-availability to user system 102. Server system 106 stores the results of the health check as instance reliability data 126.

Class reliability data 128 represents the historical availability or non-availability of a particular class of computing resources 110. For example, one or more components of system 100 (e.g., server system 106) may periodically perform a health check of one or more similar computing resources 110 to determine the availability or non-availability as a class. Class reliability data 128 may bias towards components with measures of similarity; such as hardware revision, order date, time in service, installation location, or maintenance record. In some embodiments, class reliability data 128 may be used as a proxy for instance reliability data 126 if or when instance reliability data 126 is unavailable for a particular computing resource 110.

Infrastructure repository 136 stores information related to computing resources 110. For example, server system 106 may store a hardware type, hardware parameters (e.g., processor speed, storage space, etc.), hardware revision, order date, time in service, installation location, or maintenance record for each computing resource 110 in infrastructure repository 136. Infrastructure repository 136 may additionally store details regarding the connections between computing resources 110, such as network links, network speeds, network availability, and/or connection type. In some embodiments, server system 106 may store information related to computing resources 110 in a database on storage module 108.

Component tagging module 142 receives tag information 138 from user system 102 and stores tag information 138 in storage module 108. As discussed above, tag information 138 indicates relationships between computing resources 110 and an ad hoc application.

Application definition module 144 receives application definition 140 from user system 102 and stores application definition 140 in storage module 108. Application definition 140 identifies one or more component computing resources 110 for an ad hoc application.

Graph inference module 146 constructs a directed graph (e.g., directed graph 500 illustrated in FIG. 5) including application components and one or more infrastructure components. Directed graph 500 may be constructed using data from tag information 138, application definition 140, and/or infrastructure repository 136. Graph inference module 146 may determine relationships between computing resources 110. For example, graph inference module 146 may determine that a particular computer resource 110 relies on another computer resource 110 in order to operate or be available to a user at user system 102. Graph inference module 146 organizes these relationships and constructs directed graph 500.

Application probability calculator 148 constructs conditional probability tables 600 for the directed graph based on user reliability data 124 and instance reliability data 126 for components of an ad hoc application. Example conditional probability tables 600 generated by application probability calculator 148 are discussed further below with respect to FIG. 6.

Infrastructure probability calculator 150 constructs conditional probability tables 600 for the directed causality graph based on instance reliability data 126 and class reliability data 128 for infrastructure components relied on by an ad hoc application. For an infrastructure component, the infrastructure probability calculator 150 may access databases for instance reliability data and class reliability data to construct a historical availability record for the component. Example conditional probability tables 600 generated by infrastructure probability calculator 150 are discussed further below with respect to FIG. 6.

Reliability estimator module 152 calculates reliability estimate 134 based on conditional probability tables 600 and directed graph 500. Reliability estimator module 152 may evaluate the inferred directed graph and constructed conditional probability tables 600 as a Bayesian network to produce reliability estimate 134. Exact computation of the reliability of the primary resource may be possible for simple directed graphs, such as graphs with only a single path to any component. In many cases, however, the inferred directed graph may not have a direct solution. In some embodiments, reliability estimator module 152 supports stochastic simulation of the inferred directed graph to compute the reliability of the primary resource. For example, reliability estimator module 152 may run a number of trials sampling different availability configurations according to the conditional probabilities for availability of each component in the directed graph.

Computing resources 110 may include any suitable computing resources that may be made available over a network (which may or may not be network 104). Computing resources 110 may include any suitable combination of hardware, firmware, and software. As just a few examples, computing resources 110 may include any suitable combination of applications, power, processors, storage, and any other suitable computing resources that may be made available over a network. Computing resources 110 may each be substantially similar to one another or may be heterogeneous. As described above, entities accessing computing services provided by the provisioned computing resources environment may gain access to a suite of elastic IT infrastructure services (e.g., computing resources 110) as the entity requests those services. Provisioned computing resources environment 112 may provide a scalable, reliable, and secure distributed computing infrastructure.

In the illustrated example, each computing resource 110 comprises processing unit 130 and memory unit 132. Processing unit 130 may include one or more microprocessors, controllers, or any other suitable computing devices or resources. Processing unit 130 may work, either alone or with other components of system 100, to provide a portion or all of the functionality of system 100 described herein. Memory unit 132 may take the form of volatile or non-volatile memory including, without limitation, magnetic media, optical media, RAM, ROM, removable media, or any other suitable memory component. In certain embodiments, a portion of all of memory unit 132 may include a database, such as one or more structured query language (SQL) servers or relational databases. Although FIG. 1 illustrates examples of computing resources 110 that include processing unit 130 and memory unit 132, particular embodiments may include one or more computing resources 110 that represent computing resources, components, applications, and/or infrastructure that do not include processor unit 130 and memory unit 132.

Server system 106 may be coupled or otherwise associated with a storage module 108. Storage module 108 may take the form of volatile or non-volatile memory including, without limitation, magnetic media, optical media, RAM, ROM, removable media, or any other suitable memory component. In certain embodiments, a portion of all of storage module 108 may include a database, such as one or more SQL servers or relational databases. Storage module 108 may be a part of or distinct from memory unit 122 of server system 106.

Storage module 108 may store a variety of information and applications that may be used by server system 106 or other suitable components of system 100. In the illustrated example, storage module 108 may store user reliability data 124, instance reliability data 126, class reliability 128, and infrastructure repository 136. Although storage module 108 is described as including particular information and applications, storage module 108 may store any other suitable information and applications. Furthermore, although these particular information and applications are described as being stored in storage module 108, the present description contemplates storing this particular information and applications in any suitable location, according to particular needs.

System 100 provides just one example of an environment in which the reliability estimation for ad hoc applications technique of the present disclosure may be used. The present disclosure contemplates use of the data transfer technique in any suitable computing environment. Additionally, although functionality is described as being performed by certain components of system 100, the present disclosure contemplates other components performing that functionality. As just one example, functionality described with reference to server system 106 may be performed by one or more components of computing resources 110 and/or user system 102. Furthermore, although certain components are illustrated as being combined or separate, the present disclosure contemplates separating and/or combining components of system 100 in any suitable manner. As just one example, server system 106 and one or more of computing resources 110 may be combined in a suitable manner.

Certain embodiments of the present disclosure may provide some, none, or all of the following technical advantages. For example, certain embodiments provide a reliability estimate for computing resources based on a user identification of key components and associations. Receiving user indication of certain component relationships may allow providers to generate a reliability estimate for ad hoc applications without having to disclose infrastructure, network, and computing resource details to a user of the ad hoc application. As a result, particular embodiments of the present disclosure may provide a reliability estimate in a distributed system comprising many disparate components with differing levels of availability and redundancy. Thus, providers of ad hoc applications may satisfy a user demand for reliability estimates without having to reveal the details of the provisioned system. Accordingly, having a quantifiable measure of reliability for an application increases trust and lessens the risk of using a cloud provider or ad hoc applications.

Figure 2:
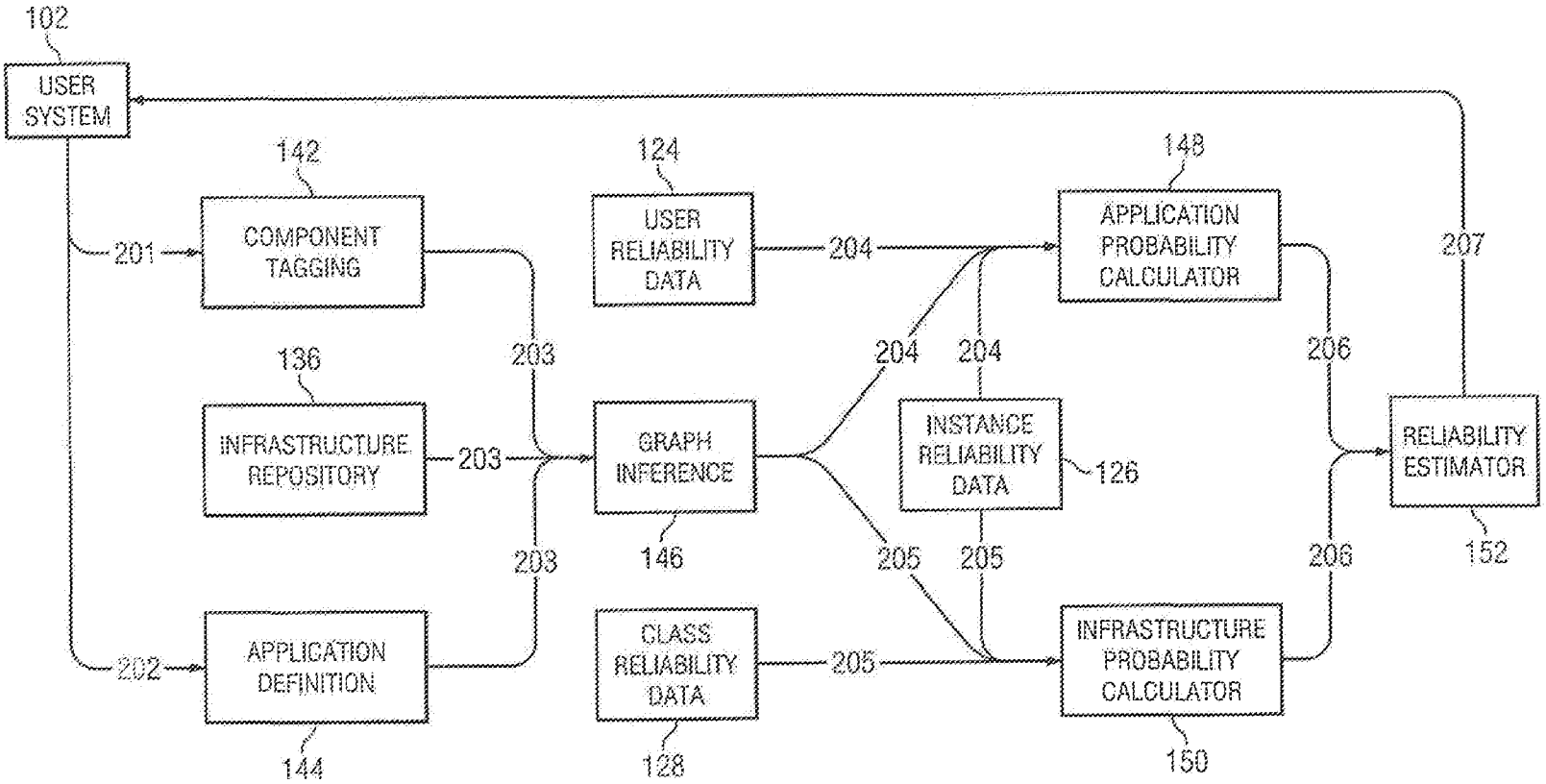
FIG. 2 is a block diagram illustrating an example process for calculating a reliability estimate that that may be performed by the example system of FIG. 1, according to certain embodiments of the present disclosure.

FIG. 2 is a block diagram illustrating an example process in which reliability estimate 134 is calculated that may be performed by the example system 100 of FIG. 1. In operation of an example embodiment of system 100, a user at user system 102 interacts with component tagging module 142 to apply one or more metadata tags (e.g., tag information 138) to computing resources 110, as represented by arrow 201. For example, if user system 102 is provisioned with an ad hoc application (e.g., an accounting software package) that runs on two processing computing resources 110 and one database computing resource 110, the user may tag each of the computing resources 110 with the string 'accounting' to associate the computing resources 110 with the provisioned ad hoc application.

Figure 4:
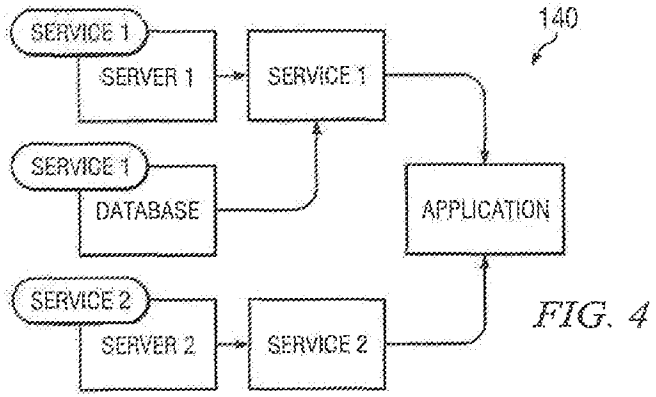
FIG. 4 illustrates an example application definition expanded to include several application components found using tag associations, according to certain embodiments of the present disclosure.

In some embodiments, multiple users using one or more user systems 102 communicate tag information 138 that include the same string. Component tagging module 142 may disambiguate usage by placing metadata tags into a namespace associated with the user that applied the tag. For example, component tagging module 142 may record the string 'accounting' for a first user as 'user1:accounting' and the string 'account' for a second users as 'user2:accounting'. Although component tagging module 142 may record each string using a namespace, when displaying tag information 138, component tagging module 142 may hide the namespace from the user. An example of tag information 138 applied to ad hoc application components is shown in FIG. 4.

Figure 3:
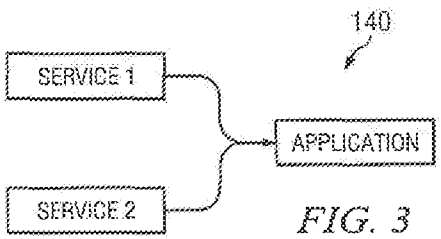
FIG. 3 illustrates an example application definition including a primary resource and two secondary resources, according to certain embodiments of the present disclosure.

Additionally or alternatively, a user at user system 102 interacts with application definition module 144 to create an application definition (e.g., application definition 140) of a provisioned ad hoc application, as represented by arrow 202. Application definition 140 includes at least a primary computing resource 110 for which reliability estimate 134 is to be calculated. In some embodiments, application definition 140 may include one or more secondary computing resources 110 that are supportive of the primary computing resource 110. For example, the primary computing resource 110 may be an software service while a secondary computing resource 110 may be a web service accessed by the software service. An example application definition 140 is shown in FIG. 3. As shown in FIG. 3, a user may construct application definition 140 by defining a primary computing resource 110 (e.g., Application), and secondary computing resources 110 (e.g., Service 1 and Service 2) upon which the primary computing resource 110 depends.

In some embodiments, application definition 140 may not define all secondary computing resources 110 used by a particular ad hoc application. Thus, graph inference module 146 may use application definition 140, tag information 138, and infrastructure repository 136 to construct the dependencies and interrelationships among the various computing resources 110 utilized by a particular ad hoc application for which reliability estimate 134 is sought, represented by arrow 203. In some embodiments, application definition module 144 defines the starting seeds for the graph inference module 146, and graph inference module 146 may expand the user-provided ad hoc application definition 140 into a more comprehensive application definition.

Figure 5:
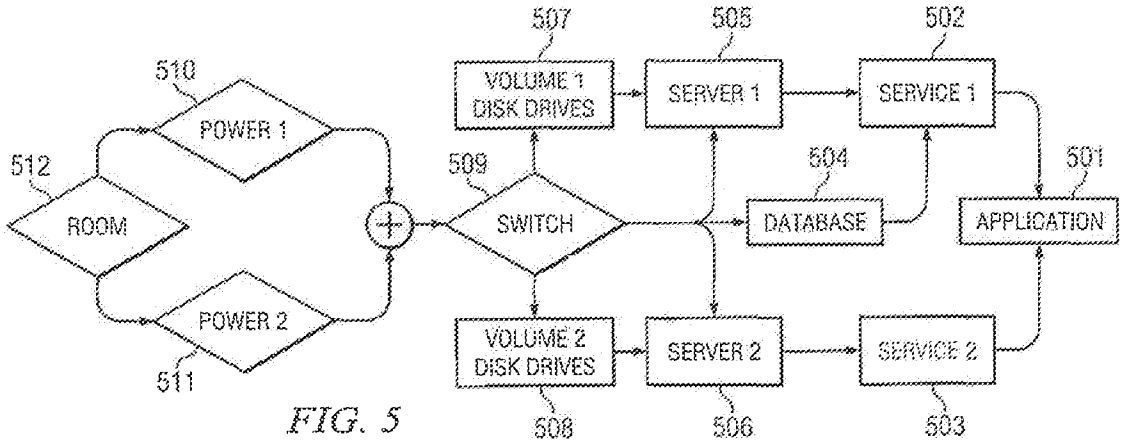
FIG. 5 illustrates an example directed graph constructed by the example system of FIG. 1 in which the example application definition of FIG. 4 is expanded to include several application and infrastructure components found using allocation and dependency relationships.

An example directed graph is shown in FIG. 5. Graph inference module 146 may recursively expand the ad hoc application definition 140 by following known component associations (as defined by tag information 138 and infrastructure repository 136) to produce a directed graph of component dependencies. For example, as shown in FIG. 5, box 501, graph inference module 146 may access databases (e.g., tag information 138 and infrastructure repository 136) to obtain one or more secondary computing resources 110 relied upon by primary computing resources 110 (e.g., Application, as shown in box 501). Graph inference module 146 may operate recursively to identify secondary computing resources 110. For example, a primary computing resource 110 may have two secondary computing resources 110. In this example, graph inference module 146 identifies "service 1" and "service 2" as secondary computing resources 110 (indicated in boxes 502 and 503), which "application" (indicated in box 501) is dependent upon. Graph inference module 146 may then determine the computing resources 110 upon which the secondary computing resources 110 depend. For example, graph inference module 146 may then determine that "service 1" (identified in box 502) depends upon "server 1" (identified in box 505) and "database" (identified in box 504). Graph inference module 146 repeats this process for each secondary computing resource 110 identified until no there are no further dependent computing resources 110, as indicated by tag information 138 and infrastructure repository 136. Thus, graph inference module 146 generates a directed graph as shown in FIG. 5.

Returning to FIG. 2, in some embodiments, a relied upon computing resource 110 is a computing resource 110 for which there exists a set of component computing resources 110 (possibly the empty set) such that the primary computing resource 110 is operable when only the set of component computing resources 110 is inoperable, and the primary computing resource 110 is inoperable when both the relied upon computing resource 110 and the set of component computing resources 110 are inoperable. For example, each disk drive in a pair of redundant drives is a relied upon component computing resource 110 even though the failure of any single drive may not cause the primary computing resource 110 to become inoperable.

Graph inference module 146 may request infrastructure components that are allocated to the application components from the infrastructure repository module 136. Infrastructure components are part of the infrastructure provider's implementation of a resource and generally kept secret, for example, the arrangement of physical racks, network switches, power supplies, air conditioners, fire suppression units, telecommunication links, and buildings.

Graph inference module 146 may request application components associated with tags from component tagging module 142. For example, graph inference module 146 may locate application components tagged with an identifier associated with a resource. FIG. 4 illustrates the example application definition 140 expanded to include several application components found using tag associations. FIG. 4 includes two computing resources 110 (e.g., a first server and a database) tagged with "Service 1" as a tag for the first service and a third computing resource 110 (e.g., a database) tagged with "Service 2" as a tag for the second service.

Graph inference module 146 may display the identified application components to a user at user system 102 for validation. Although the inference of application components may be beneficial to the user by reducing time spent defining the application or tagging, an incorrect inference may unnecessarily expand the directed graph. In some embodiments, the graph inference module 146 may support a mechanism for excluding specific application components shown in a particular directed graph, for example, by having the user a apply a tag excluding the undesired component (e.g., a "does not require" tag) to override the standard inference algorithm used by graph inference module 146.

Once directed graph 500 is generated, application probability calculator 148 analyzes dependency relationships among application components in directed graph 500 to construct a conditional probability table 600. For example, in directed graph 500 shown in FIG. 5, application probability calculator 148 calculates conditional probability tables 600 for each of Application (box 501), Service 1 (box 502), Service 2 (box 503), Database (504), Server 1 (505), Server 2 (506), Volume 1 (507), and Volume 2 (508). Data indicating the reliability of application components generated by graph inference module 146 communicated from user reliability data 124 and instance reliability data 126 may feed into application probability calculator 148, as shown by arrows 204. Application probability calculator 148 may calculate the expected availability of a respective application component in directed graph 500 based on the availability of relied upon components. For example, application probability calculator 148 calculates the availability of "Service 1" (as indicated in box 502) based on the availability of "Database" (as indicated in box 504) and "Server 1" (as indicated in box 505). For each application component for which a conditional probability table 600 is calculated, application probability calculator 148 may access user reliability data 124 and instance reliability data 126.

Additionally, once directed graph 500 is generated, infrastructure probability calculator 150 analyzes dependency relationships among infrastructure components in directed graph 500 to construct a conditional probability table 600. For example, in directed graph 500 shown in FIG. 5, infrastructure probability calculator 150 calculates conditional probability tables 600 for each of Switch (box 509), Power 1 (box 510), Power 2 (box 511) and Room (512). Data indicating the reliability of application components generated by graph inference module 146 communicated from instance reliability data 126 and class reliability data 128 may feed into infrastructure probability calculator 150, as shown by arrows 205. Infrastructure probability calculator 150 examines the directly connected relied upon components in directed graph 500 to construct a conditional probability table 600 for the availability of the infrastructure component based on the availability of the directly connected components. For example, the infrastructure probability calculator 150 may locate all of the relied upon components in directed graph 500 that directly point to a relevant component. Infrastructure probability calculator 150 may then construct a conditional probability table 600 by determining the historical availability of directly connect components.

In some embodiments, infrastructure probability calculator 150 may introduce a noise term into conditional probability table 600 to obscure the exact configuration of infrastructure components. The use of noisy probability may improve accuracy by permitting the infrastructure provider to include infrastructure details in the model that might be revealed through inspection of reliability estimates.

In some embodiments, infrastructure probability calculator 150 may factor either instance reliability data 126 or class reliability data 128 more heavily in its calculation. For example, direct observation of infrastructure components availability (e.g., instance reliability data 126) may be preferred for component availability. If no direct observation exists, the component availability may be estimated based on fleet statistics for the component (e.g., class reliability data 128).

Once conditional probability tables 600 are calculated for each component in directed graph 500, reliability estimator module 152 evaluates the directed graph 500 and conditional probability tables 600 as a Bayesian network to produce reliability estimate 134. Exact computing of reliability of the primary resource (such as, e.g., Application in directed graph 500), may be possible for simple directed graphs, such as graphs with only a single path to any component. However, in many case, directed graph may not have a direct solution. In some embodiments reliability estimator module 152 may support stochastic simulation of the inferred directed graph 500 to compute the reliability of the primary resource. For example, reliability estimator module 152 may run a number of trials sampling different availability configurations according to the conditional probabilities (as shown, e.g., in conditional probability tables 600) for each component in directed graph 500. The availability of the primary resource may then be estimated by counting the number of failures of the primary resource according to the inferred directed graph 500 over a large number of trials. Numerous trials may be run in order to obtain reliability estimate 134 of the primary resource.

A table displaying the results of an example series of trials is disclosed in Table 7 of FIG. 7. For example, a first trail ("Trial 1") begins with reliability estimator 152 assigning availability to Room (box 512 of FIG. 5) in accordance with the conditional probability table of Room. For purposes of this example, a value of "1" represents available, and a value of "0" represents unavailable. In this example, the conditional probability of Room is 1 99.999% of the time, and reliability estimator 152 assigns Room as 1 in 99.999% of trials and 0 in 0.001% of trials. In the example Trial 1, Room is assigned as 1 (but in 0.001% of trials will be assigned a 0). Next, reliability estimator 152 assigns availability to Power 1 (box 510 of FIG. 5) in accordance with the conditional probability table 600 of Power 1. In this example, the conditional probability of Power 1 is 1 99.97% of the time when Room (upon which Power 1 relies) is 1. Therefore, reliability estimator 152 assigns Power 1 as 1 in 99.97% of the trials in which it assigned Room as 1, and assigns Power 1 as 0 in 0.03% of the trials in which it assigned Room as 1. In the example Trial 1, reliability estimator 152 assigns Power 1 as 1. Reliability estimator 152 performs analogous calculations for Power 2 (box 511 in FIG. 5) and in the example Trial 1, Power 2 is assigned a 1. Next, reliability estimator 152 assigns Switch (box 509 in FIG. 5) in accordance with its conditional probability table in which Power 1 and Power 2 (upon which Switch relies) are both 1, and in example Trial 1, is assigned a 1. Next reliability estimator 152 assigns Volume 1 (box 507 in FIG. 5) in accordance with its conditional probability table in which Switch is 1, and in example Trial 1, is assigned a 1. Similar calculations are performed for each component in directed graph 500, resulting in an availability calculation for Application. In example Trial 1, Application is assigned 1.

Next, reliability estimator performs a second trial ("Trial 2"), the results of which are shown in table 700 in FIG. 7. In this example, Room is assigned 1, Power 1 is assigned 1, Power 2 is assigned 0, Switch is assigned 1, Volume 1 is assigned 1, and Application is assigned 1, in accordance with the statistical outcomes indicated by their respective conditional probability tables.

Successive trials are performed (e.g., Trial 3 through Trial 1,000,000 shown in Table 700), and the number of times Application is assigned a 1 is compared to the number of times Application is assigned 0 in the aggregate number of trials. For example, reliability estimator module 152 may determine that in 99.89% of trials, Application is assigned a 1. Thus, reliability estimate 134 is calculated to be 99.89%. Once calculated, reliability estimate 134 may be stored in storage unit 108 and/or transmitted to user system 102 to be displayed to a user.

In some embodiments, a series of a trials may represent sampling from among all possible combinations of the availability status of each component in a directed graph. For example, reliability estimator module 152 may perform availability sampling to determine reliability estimate 134 for a particular primary computing resource 110 (such as, e.g., Application shown in FIG. 5). Availability sampling may be based on one or more samples of an availability configuration of a directed graph (such as, e.g., directed graph 500 shown in FIG. 5). An availability configuration is a permutation of the availability status (where "1" represents available and "0" represents unavailable) assigned to each computing resource 110 in a directed graph (such as, e.g., directed graph 500. For example, for each availability configuration, each computing resource 110 in the directed graph is either available (i.e., "1") or unavailable (i.e., "0"). For each sample availability configuration, there is a probability that the particular availability configuration will be observed in practice. Each availability configuration has a probability between and including 0% and 100%. Some availability configurations have a 0% chance of being observed. For example, it is not possible that a server computing resource 110 is available when relied upon power supply computing resources 110 are unavailable. Thus, the probability for an availability configuration in which the server computing resource 110 is available (1) and the relied upon power supply computing resources 110 are unavailable (0) is 0%. The sum of the probabilities across every possible availability configuration is 100%.

Reliability estimator module 152 may calculate the probability of a particular availability configuration based on conditional probability tables 600. As discussed further below, conditional probability tables 600 give a probability for each component to exist in a particular availability configuration, given the availability status of relied upon components. Since an availability configuration gives an availability status for each component in a directed graph simultaneously, the probability of the availability configuration occurring in practice is then the product of each of the component probabilities as indicated in the conditional probability table 600 associated with each component. The set of all availability configurations can be enumerated in a table in which each row is a particular availability configuration and each column is a component in a directed graph (such as, e.g., directed graph 500).

Since each component in a directed graph is assigned a 0 or 1, the total number of configurations (rows in the table) is 2 to the power of the number of components present in the directed graph (i.e., $2^N$). Even a small number of components makes examining every row (i.e., the probability associated with each availability configuration) infeasible. For example, a directed graph with 50 components would have a table with over one quadrillion rows. Therefore, in some embodiments, selected availability configurations are sampled in order to calculate reliability estimate 134. Sampling may be performed according to one or more methods. For example, in some embodiments, reliability estimator module 152 may divide the availability configurations into groups of relatively equal probability and may select particular samples from each group. The sampling performed may be an orthogonal sampling method, such as orthogonal Lain hypercube sampling.

In some embodiments, reliability estimator module 152 performs sampling by working backwards from the availability of the primary resource (such as, e.g., Application in directed graph 500 shown in FIG. 5). Assuming a priori that a primary resource is either available or not available, based on conditional probability tables 600, there is a probability for the resources that the primary resource relies upon to be available or unavailable in a configuration, given the assumed state for the primary resource. Reliability estimator module 152 may then sample from among these configurations by any appropriate method, such as, for example, greedy algorithmic sampling and/or orthogonal sampling.

After sampling is performed, the sample probabilities are summed according to whether the primary resource is available or unavailable, producing two probabilities: an available probability ("A") and an unavailable probability ("U"). The sum of A and U is greater than or equal to 0 but less than or equal to 1. In some embodiments, reliability estimator module 152 scales the available probability to 1 to calculate reliability estimate 134 (i.e., by calculating A/(A+U)).

Reliability estimate 134 is most accurate when A+U is close to 1 and becomes increasingly inaccurate as A+U approaches 0 since scaling the measurements is an approximation for the configurations that are not sampled. Reliability estimator module 152 may go back and perform additional sampling if A+U is too small to improve the accuracy of reliability estimate 134.

FIG. 3 illustrates an example application definition 140 including a primary resource (e.g., an ad hoc application), and two secondary resources (e.g., a first service and a second service). In some embodiments, a first and second service are resources a primary resource depends upon for operation. For example, if a primary resource is a software application hosted on a website, a first service may represent a web server, and a second service may represent a database. A user at user system 102 may tag Service 1 with a "Service 1" tag, Service 2 with a "Service 2" tag, and tag Application with "Service 1" and "Service 2" tags.

FIG. 4 illustrates an example application definition 140 from FIG. 3 expanded to include several application components found using tag associations (such as, e.g., based on tag information 138 received from user system 102) and infrastructure repository 136. FIG. 4 includes a first server and database tagged with Service 1 as an identifier for the first service and a second server tagged with Service 2 as an identifier for the second service.

FIG. 5 illustrates an example directed graph 500 constructed by graph inference module 146 in which the example application definition 140 from FIG. 4 is expanded to include several application and infrastructure components found using allocation and dependency relationships (e.g., based on tag information 138 and application definition 140). FIG. 5 includes a service 1 (box 502), service 2 (box 503), database (box 504), server 1 (box 505), server 2 (box 506), first drive volume (box 507) and a second drive volume (box 508) application components, a network switch (box 509), a first power supply (box 510), a second power supply (box 511) and room (box 512) infrastructure components.

FIG. 6 illustrates conditional probability tables 600a-c (which may be referred to individually as "conditional probability table 600" or collectively as "conditional probability tables 600") for application and infrastructure components included in directed graph 500 shown in FIG. 5. Although FIG. 6 shows example conditional probability tables 600 based on components illustrated in FIG. 5, it should be understood that any suitable conditional probability table 600 may be generated based on the particular configuration of system 100. In particular embodiments, conditional probability table 600 includes the permutations of the available and not available status of relied upon components for each component in a directed graph (e.g., directed graph 500). The status is represented as a binary conditional, in which 1 represents available, and 0 represents unavailable. For example, if a primary component relies upon first and second secondary components, a conditional probability table 600 includes a first row in which the first secondary component is 0 and the second secondary component is 0, a second row in which the first secondary component is 0 and the second secondary component is 1, a third row in which the first secondary component is 1 and the second secondary component is 0, and a fourth row in which the first secondary component is 1 and the second secondary component is 1. Thus, a conditional probability table 600 includes a row for each permutation of the availability of directly relied upon components for each component in a directed graph (e.g., directed graph 500).

Conditional probability tables 600 for application components may be calculated by application probably calculator 148 and infrastructure components may be calculated by infrastructure probability calculator 150. For example, conditional probably table 600a illustrates conditional probabilities for Server 1 (box 505 in FIG. 5). Server 1 relies upon Volume 1 (box 507 in FIG. 5) and Switch (box 509 in FIG. 5). The available/non-available conditions for Volume 1 and Switch are shown in the first column and second column of conditional probably table 600a, respectively. The available/non-available condition for Server 1, which is dependent on the Volume 1 and Switch columns, is shown in the third column. The availability of Server 1 (expressed as a percentage) is determined based on the availability of Volume 1 and Switch, represented as a binary condition, with 1 representing available, and 0 representing not available. For example, with reference to the first row of conditional probability table 600a, Volume 1 is 0 and Switch is 0, and Server 1 is therefore 0%, because Server 1 is not operational if Volume 1 and Switch are not available. With reference to the second row of conditional probability table 600a, Volume 1 is 1 and Switch is 0, and Server 1 is therefore 0%, because Server 1 is not operational if Switch is not available. With reference to the third row of conditional probability table 600a, Volume 1 is 0 and Switch is 1, and Server 1 is therefore 0%, because Server 1 is not operational if Volume 1 is not available. With reference to the fourth row of conditional probability table 600a, Volume 1 is 1 and Switch 1 is 1, and Server 1 is therefore 99.8%. If Volume 1 and Switch 1 are available, then the availability of Server 1 is based on historical reliability metrics data (such as, e.g., user reliability data 124, instance reliability data 126, and/or class reliability data 128), as discussed above.

Conditional probability table 600b illustrates conditional probabilities for the Database component illustrated in FIG. 5 (box 504). The Database component relies upon the Switch component (box 509 in FIG. 5). The available/not available condition for the Switch component is shown in the first column, and the available/not available condition for the Database component, which is dependent on the available/non-available condition in the Switch column, is shown in the second column. With reference to the first row of conditional probability table 600b, Switch is 0, and Database is therefore 0%. Because the Database component is dependent upon the Switch component, the Database component is not available when the Switch component is not available. With reference to the second row of conditional probability table 600b, Switch is 1, and Database is 99.76%. Because the Switch component is available, the availability of the Database component is determined from historical reliability metrics data (such as, e.g., user reliability data 124, instance reliability data 126, and/or class reliability data 128), as discussed above.

Conditional probability table 600c illustrates conditional probabilities for the Switch component illustrated in FIG. 5 (box 509). The Switch component relies upon the Power 1 component (box 510) or the Power 2 component (box 511). That is, the Power 1 and Power 2 components are redundant dependencies to the Switch component. With reference to the first row of conditional probability table 600c, Power 1 is 0 and Power 2 is 0, and Switch is therefore 0%. Because the Switch component is dependent upon the Power 1 or Power 2 components, the Switch component 511 is not available when both Power 1 and Power 2 are not available. With reference to the second row of conditional probability table 600c, Power 1 is 0 and Power 2 is 1, and Switch is 99.99%. If either Power 1 or Power 2 are available, the availability of the Switch component is determined from historical reliability metrics data (such as, e.g., user reliability data 124, instance reliability data 126, and/or class reliability data 128), as discussed above. Similarly, with reference to the third row of conditional probability table 600d, Power 1 is 1 and Power 2 is 0, and Switch is 99.99%. With reference to the fourth row of conditional probability table 600c, Power 1 is 1 and Power 2 is 1, and Switch is 99.99%. Since Power 1 and Power 2 are both available (although only either Power 1 or Power two need be available for this condition to result), the availability is determined from historical reliability metrics data.

FIG. 7 illustrates a table 700 that includes the results of an example series of trials performed by reliability estimator 152 to calculate reliability estimate 134. As discussed above, successive trials are performed (e.g., Trial 1 through Trial 1,000,000 shown in Table 700), and the number of times Application is assigned a 1 is compared to the number of times Application is assigned 0 in the aggregate number of trials. For example, reliability estimator module 152 may determine that in a series of 1,000,000 trials, Application is available in 998,990 trials, and unavailable in 1100 trials. Thus, reliability estimator module calculates reliability estimate 134 to be 99.89%.

Figure 8:
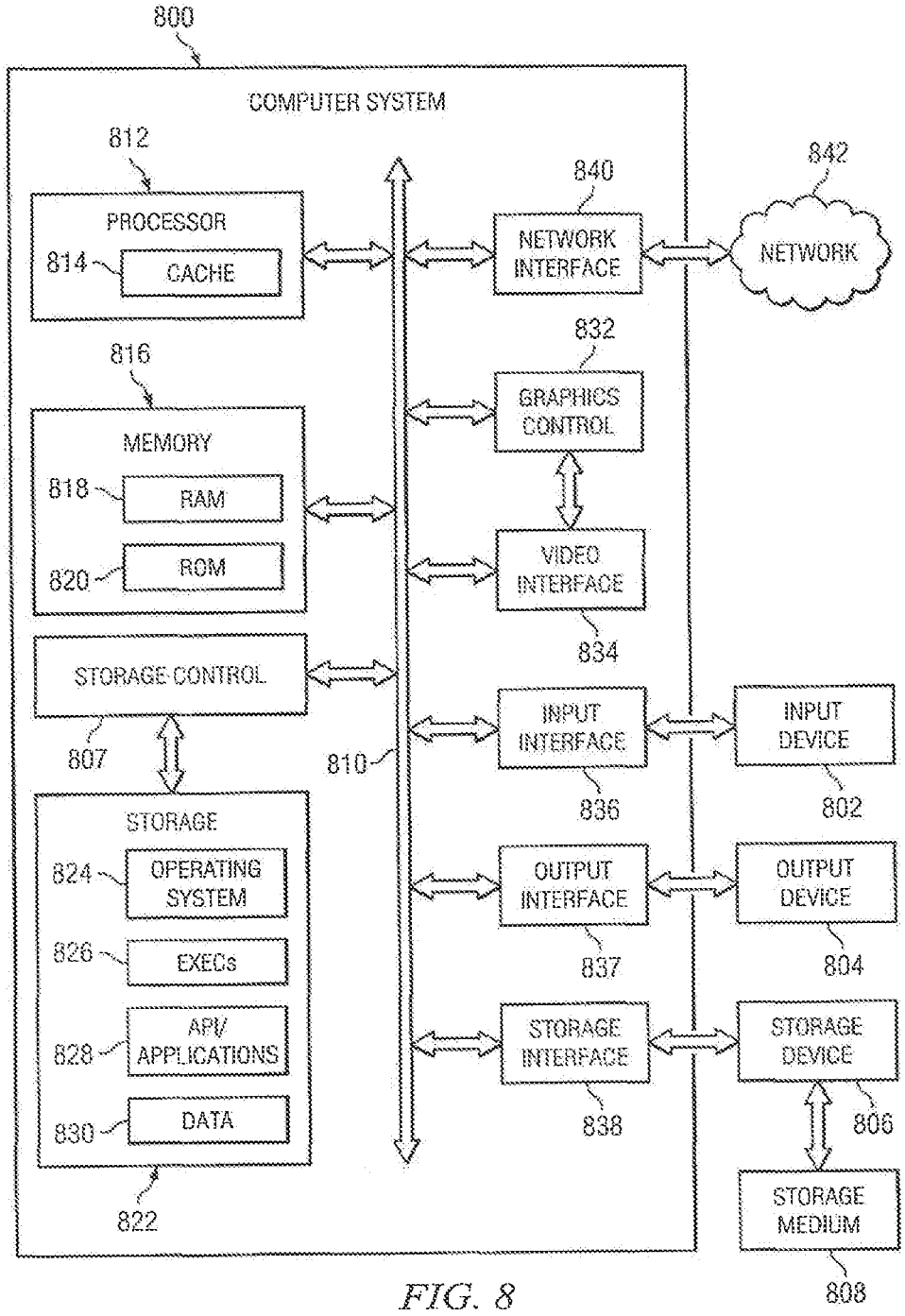
FIG. 8 illustrates an example computer system that may be used for one or more portions of the example system of FIG. 1, according to certain embodiments of the present disclosure.

FIG. 8 illustrates an example computer system 800 that may be used for one or more portions of the example system 100 of FIG. 1, according to certain embodiments of the present disclosure. Although the present disclosure describes and illustrates a particular computer system 800 having particular components in a particular configuration, the present disclosure contemplates any suitable computer system having any suitable components in any suitable configuration. Moreover, computer system 800 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Portions or all of user system 102, server system 106, storage module 108, and computing resources 110 may be implemented using all of the components, or any appropriate combination of the components, of computer system 800 described below.

Computer system 800 may have one or more input devices 802 (which may include a keypad, keyboard, mouse, stylus, or other input devices), one or more output devices 804 (which may include one or more displays, one or more speakers, one or more printers, or other output devices), one or more storage devices 806, and one or more storage media 808. An input device 802 may be external or internal to computer system 800. An output device 804 may be external or internal to computer system 800. A storage device 806 may be external or internal to computer system 800. A storage medium 808 may be external or internal to computer system 800.

System bus 810 couples subsystems of computer system 800 to each other. Herein, reference to a bus encompasses one or more digital signal lines serving a common function. The present disclosure contemplates any suitable system bus 810 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 800 includes one or more processors 812 (or central processing units (CPUs)). A processor 812 may contain a cache 814 for temporary local storage of instructions, data, or computer addresses. Processors 812 are coupled to one or more storage devices, including memory 816. Memory 816 may include RAM 818 and ROM 820. Data and instructions may transfer bi-directionally between processors 812 and RAM 818. Data and instructions may transfer uni-directionally to processors 812 from ROM 820. RAM 818 and ROM 820 may include any suitable computer-readable storage media.

Computer system 800 includes fixed storage 822 coupled bi-directionally to processors 812. Fixed storage 822 may be coupled to processors 812 via storage control unit 807. Fixed storage 822 may provide additional data storage capacity and may include any suitable computer-readable storage media. Fixed storage 822 may store an operating system (OS) 824, one or more executables (EXECs) 826, one or more applications or programs 828, data 830 and the like. Fixed storage 822 is typically a secondary storage medium (such as a hard disk) that is slower than primary storage. In appropriate cases, the information stored by fixed storage 822 may be incorporated as virtual memory into memory 816. In certain embodiments, fixed storage 822 may include network resources, such as one or more storage area networks (SAN) or network-attached storage (NAS).

Processors 812 may be coupled to a variety of interfaces, such as, for example, graphics control 832, video interface 834, input interface 836, output interface 837, and storage interface 838, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 840 may couple processors 812 to another computer system or to network 842. Network interface 840 may include wired, wireless, or any combination of wired and wireless components. Such components may include wired network cards, wireless network cards, radios, antennas, cables, or any other appropriate components. With network interface 840, processors 812 may receive or send information from or to network 842 in the course of performing steps of certain embodiments. Certain embodiments may execute solely on processors 812. Certain embodiments may execute on processors 812 and on one or more remote processors operating together.

In a network environment, where computer system 800 is connected to network 842, computer system 800 may communicate with other devices connected to network 842. Computer system 800 may communicate with network 842 via network interface 840. For example, computer system 800 may receive information (such as a request or a response from another device) from network 842 in the form of one or more incoming packets at network interface 840 and memory 816 may store the incoming packets for subsequent processing. Computer system 800 may send information (such as a request or a response to another device) to network 842 in the form of one or more outgoing packets from network interface 840, which memory 816 may store prior to being sent. Processors 812 may access an incoming or outgoing packet in memory 816 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 816 may include one or more tangible, computer-readable storage media embodying software and computer system 800 may provide particular functionality described or illustrated herein as a result of processors 812 executing the software. Memory 816 may store and processors 812 may execute the software. Memory 816 may read the software from the computer-readable storage media in mass storage device 816 embodying the software or from one or more other sources via network interface 840. When executing the software, processors 812 may perform one or more steps of one or more processes described or illustrated herein, which may include defining one or more data structures for storage in memory 816 and modifying one or more of the data structures as directed by one or more portions the software, according to particular needs.

In certain embodiments, the described processing and memory elements (such as processors 812 and memory 816) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 800 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Moreover, data transfer techniques consistent with the present disclosure may be used to communicate any suitable type of data over any suitable type of network. For example, although the present disclosure has been described primarily with reference to reliability metrics data, the present disclosure contemplates processing any suitable type of data for communication of a communication network (e.g., network 104).

What is claimed is:

1. A system comprising:

one or more memory units with executable instructions; and one or more processing units that, when executing the instructions in the one or more memory units, are operable to:

receive an application definition associated with an ad hoc application provisioned from one or more computing resources delivered over a network, the application definition identifying a first group of components, the first group of components comprising the ad hoc application and one or more computing resources relied on by the ad hoc application;

receive tag information from a user, the tag information indicating one or more aspects of the first group of components;

access infrastructure data from an infrastructure repository, the infrastructure data identifying a second group of components, the second group of components comprising one or more computing resources of a distributed architecture that are associated with at least a subset of one or more components in the first group of components;

generate a plurality of conditional probability tables, one conditional probability table for at least a first subset of the components in the first group of components and at least a second subset of the second group of components, the plurality of conditional probability tables identifying at least an availability of a respective component of at least the first subset of the first group of components or at least the second subset of the second group of components based at least in part on a second availability of one or more relied upon components of the first group of components or the second group of component, where the one or more relied upon components are components utilized, at least in part, during operation of the respective component; and based at least in part on the plurality of conditional probability tables, calculate a reliability estimate for the ad hoc application by at least performing a plurality of trials, wherein performing the plurality of trials comprises assigning a status of either available or not available to at least a portion of the components in a directed graph, the status based at least in part on a particular conditional probability table associated with a particular component and the status of one or more directly relied upon components.

2. The system of claim 1, wherein the one or more processing units are further operable to:

based at least in part on the application definition, the tag information, and the infrastructure data, generate the directed graph, the directed graph comprising the components from the first group of components and second group of components and indicating one or more dependency relationships among the components; and wherein at least a portion of the plurality of conditional probability tables table is are associated with at least one of the one or more components in the directed graph, and the one or more processing units are further operable to calculate the reliability estimate based at least in part on the plurality of conditional probability tables and the directed graph.

3. The system of claim 1, wherein the processing units are further operable to access reliability metrics data for at least the first subset of the first group of components and at least the second subset of the second group of components, wherein the reliability metrics data comprise at least one of:

user reliability data, the user reliability data comprising historical availability data of the ad hoc application determined by one or more users of the ad hoc application;

instance reliability data, the instance reliability data comprising historical availability of a particular component associated with the ad hoc application;

class reliability data, the class reliability data comprising historical availability data associated with a plurality of types of components associated with the ad hoc application; and wherein the processing units are operable to generate the conditional probability table for at least the first subset of the first group of components and at least the second subset of the second group of components based at least in part on the reliability metrics data.

4. The system of claim 1, wherein the one or more processing units are operable to generate the conditional probability table for at least the first subset of the first group of components and at least the second subset of the second group of components by:

for at least a third subset of components in the first group of components and the second group of components, determining the one or more relied upon components;

generating one or more rows in the conditional probability table, the one or more rows comprising a subset of permutations, the subset of permutations indicating availability of at least a portion of the one or more relied upon components by the third subset of components; and for the one or more rows, determining the availability of the respective component based at least in part on the subset of permutations.

5. The system of claim 1, wherein the one or more processing units are operable to calculate the reliability estimate for the ad hoc application by:

after performing the plurality of trials, calculating a first number of times the ad hoc application is assigned a status of available;

after performing the plurality of trials, calculating a second number of times the ad hoc application is assigned a status of not available; and comparing the first number of times the ad hoc application is assigned a status of available to the second number of times the ad hoc application is assigned a status of not available.

6. The system of claim 1, further comprising, for at least a portion of the plurality of conditional probability tables, combining the availability of the respective component identified in the conditional probability table with a generated number.

7. The system of claim 2, wherein the one or more processing units are operable to calculate the reliability estimate for the ad hoc application by:

sampling a plurality of availability configurations from a set of all availability configurations, the sampled availability configurations based at least in part on the directed graph and indicating a status of available or not available to at least a portion of the components in the directed graph; and for at least a subset of the sampled availability configuration, determining the probability of the availability configuration based at least in part on a particular conditional probability table associated with at least a subset of the components in the directed graph.

8. The system of claim 7, wherein the one or more processing units are operable to sample the plurality of availability configurations based at least in part on a hypercube sampling algorithm.

9. The system of claim 7, wherein the one or more processing units are further operable to calculate the reliability estimate by summing the probabilities of the sampled availability configurations.

10. The system of claim 1, wherein the one or more processing units are further operable to calculate the reliability estimate for the ad hoc application based at least in part on a result of the plurality of trials.

11. A computer-implemented method, comprising:

identifying one or more components associated with an ad hoc application and upon which the ad hoc application relies, wherein identifying one or more components comprises:

obtaining an application definition associated with the ad hoc application, the application definition received from a user and comprising a first group of components, the first group of components including the ad hoc application and one or more components relied upon by the ad hoc application;

obtaining tag information, the tag information indicating one or aspects of the first group of components; and obtaining, based at least in part on the tag information and [the] application data, infrastructure data from an infrastructure repository, the infrastructure data identifying a second group of components, the second group of components comprising one or more computing resources of a distributed architecture associated with the ad hoc application;

generating a directed graph, the directed graph comprising at least a subset of components of the first group of components and the second group of components and indicating one or more dependency relationships among the subset of components;

generating a plurality of conditional probability tables, based at least in part on the subset of components in the directed graph, wherein the plurality of conditional probability tables are based at least in part on one or more of the dependency relationships identified in the directed graph and indicates availability of a respective component based at least in part on availability of at least one relied upon component; and calculating, based at least in part on the directed graph, the reliability estimate for the ad hoc application, wherein calculating the reliability estimate for the ad hoc application comprises performing a plurality of trials, wherein performing the plurality of trials comprises, assigning a status of either available or not available to at least a portion of the components in the directed graph, the assigned status based at least in part on a particular conditional probability table associated with a particular component of the portion of the components in the directed graph and the assigned status of one or more directly relied upon components.

12. The method of claim 11, wherein generating the directed graph comprises*:*

[Generating] *generating* the directed graph based at least in part on the application definition, the tag information, the infrastructure data and the conditional probability tables.

13. The method of claim 12, further comprising:

obtaining reliability metrics data associated with one or more components in the directed graph, the reliability metrics data comprising at least one of:

user reliability data, the user reliability data comprising historical availability data of the ad hoc application determined by one or more users of the ad hoc application;

instance reliability data, the instance reliability data comprising historical availability of components associated with the ad hoc application; and class reliability data, the class reliability data comprising historical availability data associated with one or more types of components associated with the ad hoc application.

14. The method of claim 13, wherein assigning the status to at least a portion of the components comprises:

determining whether a particular component of a portion of components directly relied upon by a respective component is assigned available or not available status; and if the assigned status of the particular component is available, assigning the status to the respective component based at least in part on the reliability metrics data.

15. The method of claim 11, wherein calculating a reliability estimate comprises:

after performing the plurality of trials, calculating a first number of times the ad hoc application is assigned the status of available;

after performing the plurality of trials, calculating a second number of times the ad hoc application is assigned the status of not available; and comparing the first number of times the ad hoc application is assigned the status of available to the second number of times the ad hoc application is assigned the status of not available.

16. The method of claim 12, wherein calculating the reliability estimate for the ad hoc application comprises:

sampling a plurality of availability configurations from a set of availability configurations, at least a subset of the availability configurations based at least in part on the directed graph and indicating the status of available or not available for at least the portion of the components in the directed graph; and for at least a subset of the sampled availability configurations, determining the probability of a particular availability configuration based at least in part on the conditional probability table associated with a portion of the components in the directed graph.

17. The method of claim 16, wherein sampling the plurality of availability configurations comprises sampling the plurality of availability configurations based at least in part on a hypercube sampling algorithm.

18. The method of claim 16, wherein calculating the reliability estimate further comprises summing the probabilities of the sampled availability configurations.

19. A non-transitory computer-readable medium comprising logic, the logic when executed by one or more processing units operable to perform operations comprising:

receiving, from a user, a request for a reliability estimate associated with an ad hoc application;

in response to the request, identifying one or more components associated with the ad hoc application and upon which the ad hoc application relies;

accessing infrastructure data from an infrastructure repository, the infrastructure data identifying a second group of components, the second group of components comprising one or more computing resources of a distributed architecture associated with the ad hoc application;

generating a directed graph, the directed graph comprising one or more identified components and indicating one or more dependency relationships among the one or more identified components;

accessing reliability metrics data, the reliability metrics data comprising at least one of user reliability data, instance reliability data, and class reliability data, the reliability metrics data associated with one or more identified components in the directed graph;

generating a plurality of conditional probability tables, at least one conditional probability table for at least a subset of the one or more identified components in the directed graph, wherein at least a portion of the plurality of conditional probability tables are based at least in part on the one or more of the dependency relationships identified in the directed graph and indicating availability of a respective component based at least in part on availability of at least one relied upon component;

calculating, based at least in part on the directed graph and the reliability metrics data, the reliability estimate for the ad hoc application, wherein calculating the reliability estimate for the ad hoc application comprises performing a plurality of trials, wherein performing the plurality of trials comprises, assigning a status of either available or not available to at least a subset of the one or more identified components in the directed graph, the assigned status being based at least in part on a particular conditional probability table of the plurality of conditional probability tables associated with a particular component and the assigned status of one or more directly relied upon components; and transmitting the reliability estimate to the user.

20. The non-transitory computer-readable medium of claim 19, wherein identifying the one or more components associated with the ad hoc application comprises:

accessing an application definition associated with the ad hoc application, the application definition received from the user and comprising a first group of components, the first group of components including the ad hoc application and one or more components relied upon by the ad hoc application;

accessing tag information, the tag information indicating one or more aspects of the first group of components; and accessing, based at least in part on the tag information and application data, infrastructure data from an infrastructure repository, the infrastructure data identifying the second group of components, the second group further comprising one or more components of the ad hoc application.

21. The non-transitory computer-readable medium of claim 20, wherein generating the directed graph comprises:

generating the directed graph based at least in part on the application definition, the tag information, the infrastructure data and the conditional probability tables.

22. The non-transitory computer-readable medium of claim 19, wherein:

the user reliability data comprises historical availability data of the ad hoc application determined by one or more other users of the ad hoc application;

the instance reliability data comprises historical availability of a particular component associated with the ad hoc application; and the class reliability data comprises historical availability data associated with one or more types of components associated with the ad hoc application.

23. The non-transitory computer-readable medium of claim 19, wherein assigning the status to at least the subset of the one or more identified components comprises:

determining whether the subset of the one or more identified components directly relied upon by the respective component is assigned available or not available status; and if the status of the subset of the one or more identified components is available, assigning the status to the respective component based at least in part on the reliability metrics data.

24. The non-transitory computer-readable medium of claim 19, wherein calculating the reliability estimate comprises:

after performing the plurality of trials, calculating a first number of times the ad hoc application is assigned the status of available;

after performing the plurality of trials, calculating a second number of times the ad hoc application is assigned the status of not available; and comparing the first number of times the ad hoc application is assigned the status of available to the second number of times the ad hoc application is assigned the status of not available.

25. The non-transitory computer-readable medium of claim 21, wherein the operations further comprise, for at least a subset of the plurality of conditional probability tables, combining an availability of the one or more identified components in [the] a particular conditional probability table with a generated number.

26. The non-transitory computer-readable medium of claim 21, wherein the logic is operable to calculate the reliability estimate for the ad hoc application by:

sampling a plurality of availability configurations from a set of availability configurations, the set of the availability configurations based at least in part on the directed graph and indicating the status of available or the status of not available for at least a subset of the one or more identified components in the directed graph; and for at least a portion of the sampled availability configuration, determining a probability of the availability configuration based at least in part on a particular conditional probability table associated with for at least a subset of the one or more identified components in the directed graph.

27. The non-transitory computer-readable medium of claim 26, wherein the logic is operable to sample the plurality of availability configurations based at least in part on a hypercube sampling algorithm.

28. The non-transitory computer-readable medium of claim 26, wherein the logic is further operable to calculate the reliability estimate by summing the probabilities of the sampled availability configurations.

29. The non-transitory computer-readable medium of claim 19, wherein the logic is further operable to determine the plurality of trials such that the plurality of trials represents a sampling from among a set of possible combinations of the assigned status of the one or more identified components in the directed graph.

*30. The system of claim 2, wherein the tag information furthers indicates at least one dependency relationship between at least one of the components from the first group of components and at least one of the components from the second group of components.*

*31. The system of claim 2, wherein the tag information furthers indicates at least one component from the first or the second group of components to exclude from the directed graph.*

*32. The method of claim 12, wherein the tag information furthers indicates at least one dependency relationship between at least one of the components from the first group of components and at least one of the components from the second group of components.*

*33. The method of claim 12, wherein the tag information furthers indicates at least one component from the first or the second group of components to exclude from the directed graph.*

* * * * *